June 11, 1968  A. BRODZINSKY ET AL  3,388,332
COMPUTER DEVICE FOR AIRCRAFT CARRIER APPROACH SYSTEM
Original Filed Nov. 30, 1951  7 Sheets-Sheet 1
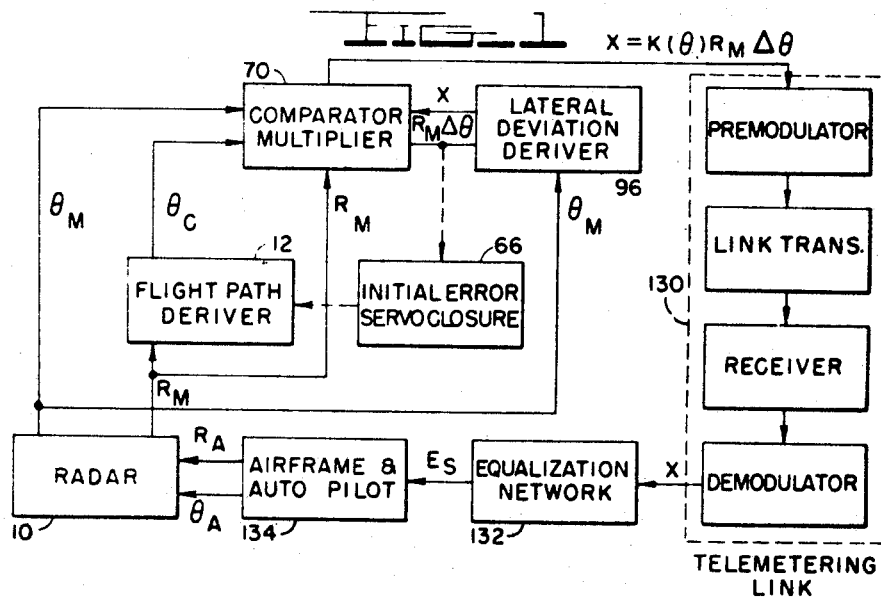
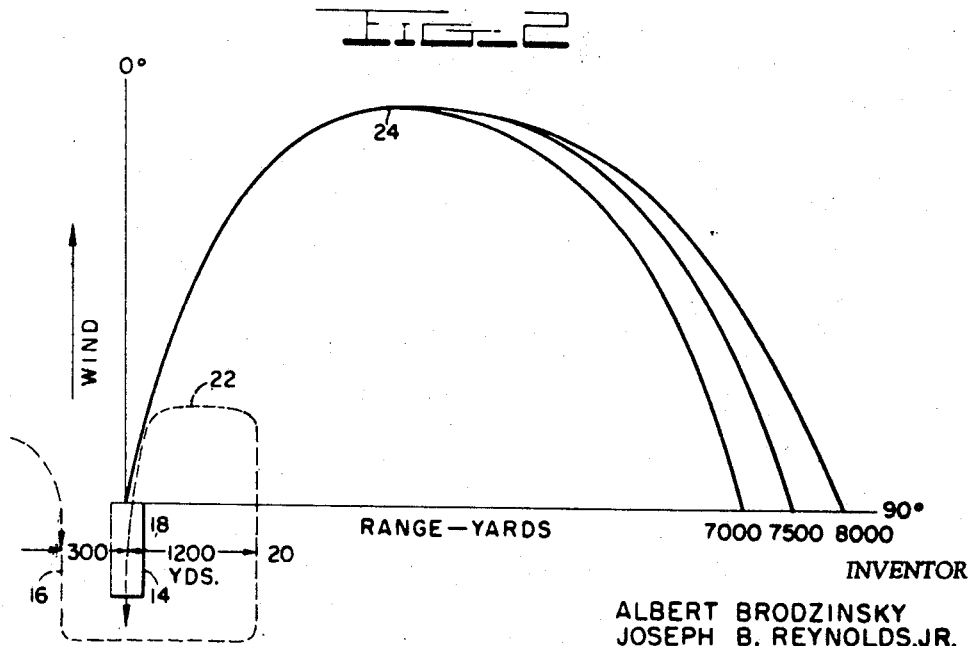
INVENTOR
ALBERT BRODZINSKY
JOSEPH B. REYNOLDS, JR.
IRVING M. SAFFITZ

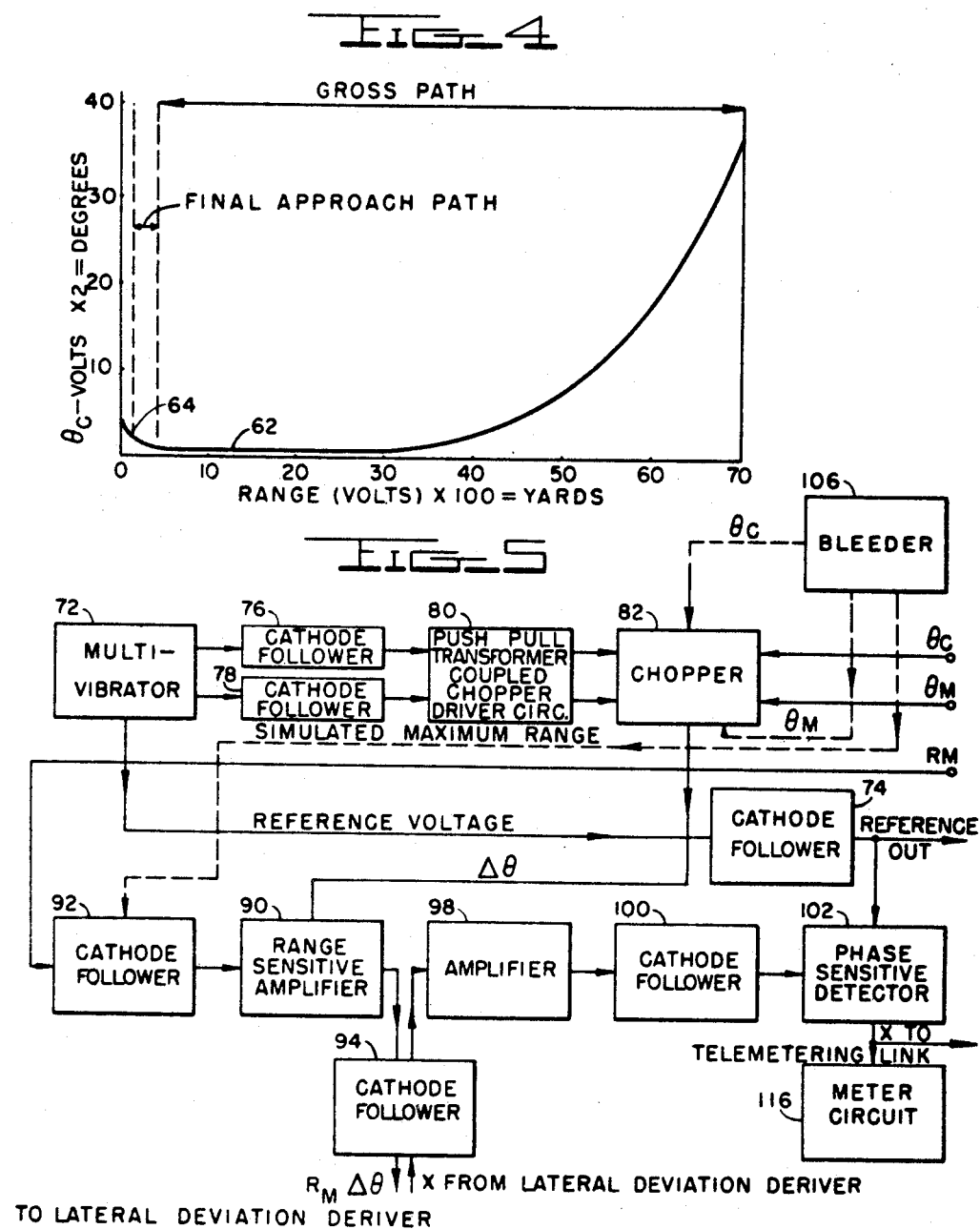

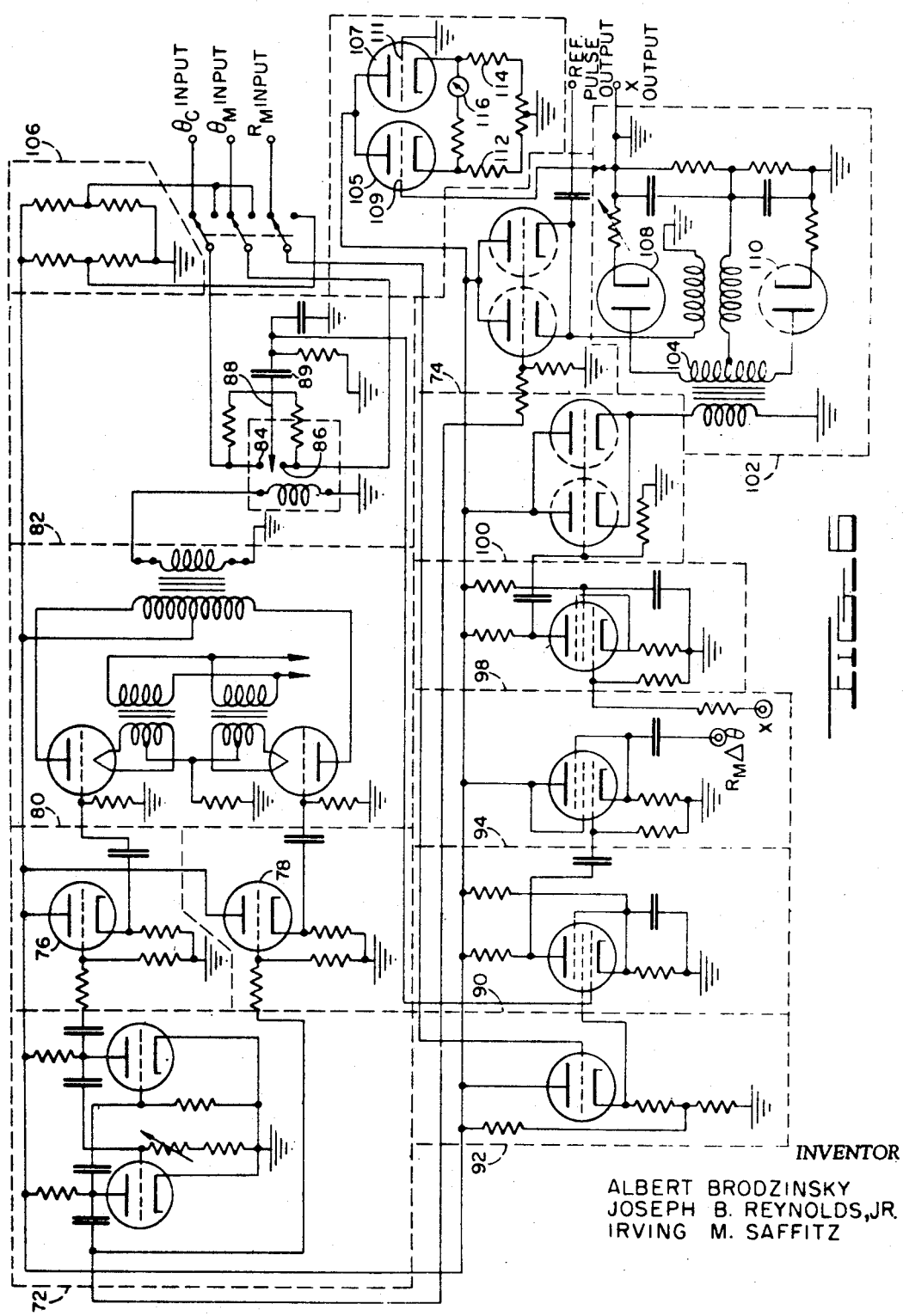

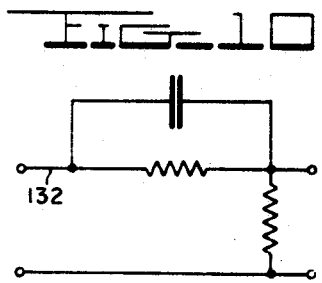
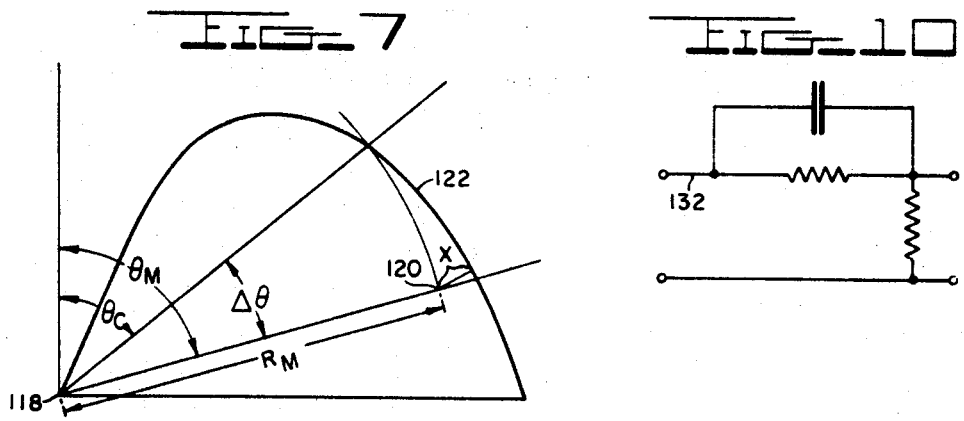
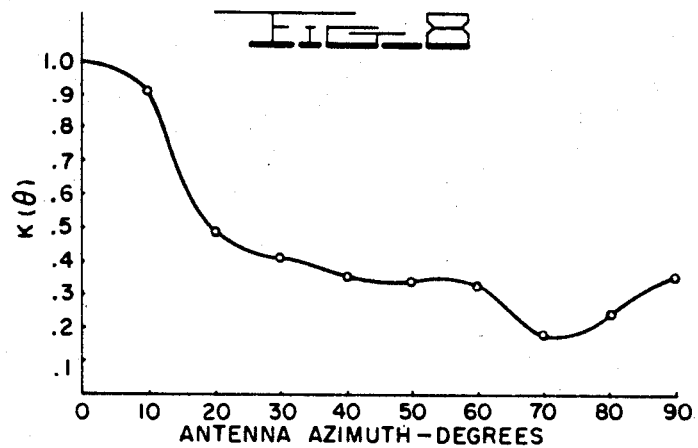
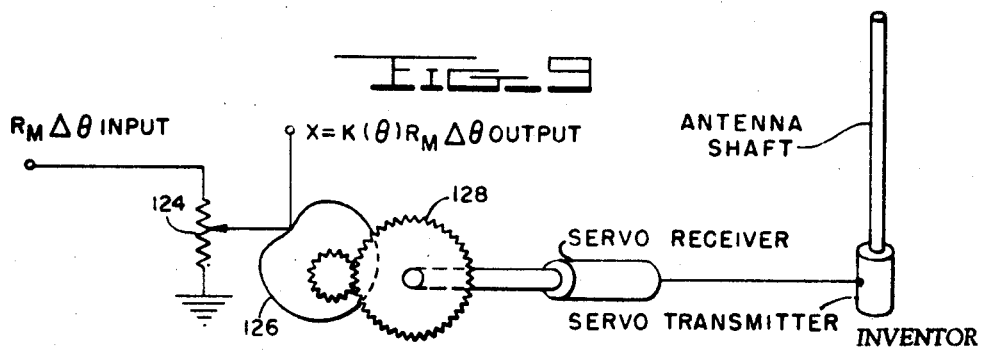

INVENTOR
ALBERT BRODZINSKY
JOSEPH B. REYNOLDS, JR.
IRVING M. SAFFITZ

INVENTOR
ALBERT BRODZINSKY
JOSEPH B. REYNOLDS, JR.
IRVING M. SAFFITZ 3,388,332
COMPUTER DEVICE FOR AIRCRAFT
CARRIER APPROACH SYSTEM
Albert Brodzinsky, Joseph B. Reynolds, Jr., and Irving
M. Saffitz, Washington, D.C., assignors to the United
States of America as represented by the Secretary of
the Navy
Original application Nov. 30, 1951, Ser. No. 259,275, now
Patent No. 3,131,018, dated Apr. 28, 1964. Divided and
this application Nov. 27, 1963, Ser. No. 334,958
2 Claims. (Cl. 328—142)

ABSTRACT OF THE DISCLOSURE

A computer device located on an aircraft carrier for deriving a flight path for an approaching aircraft. An approximately semicircular path is created by taking a voltage corresponding to the aircraft's distance from the carrier and first generating a gross flight path signal and then generating a final approach signal when the aircraft comes within a predetermined distance.

---

Figure 3:
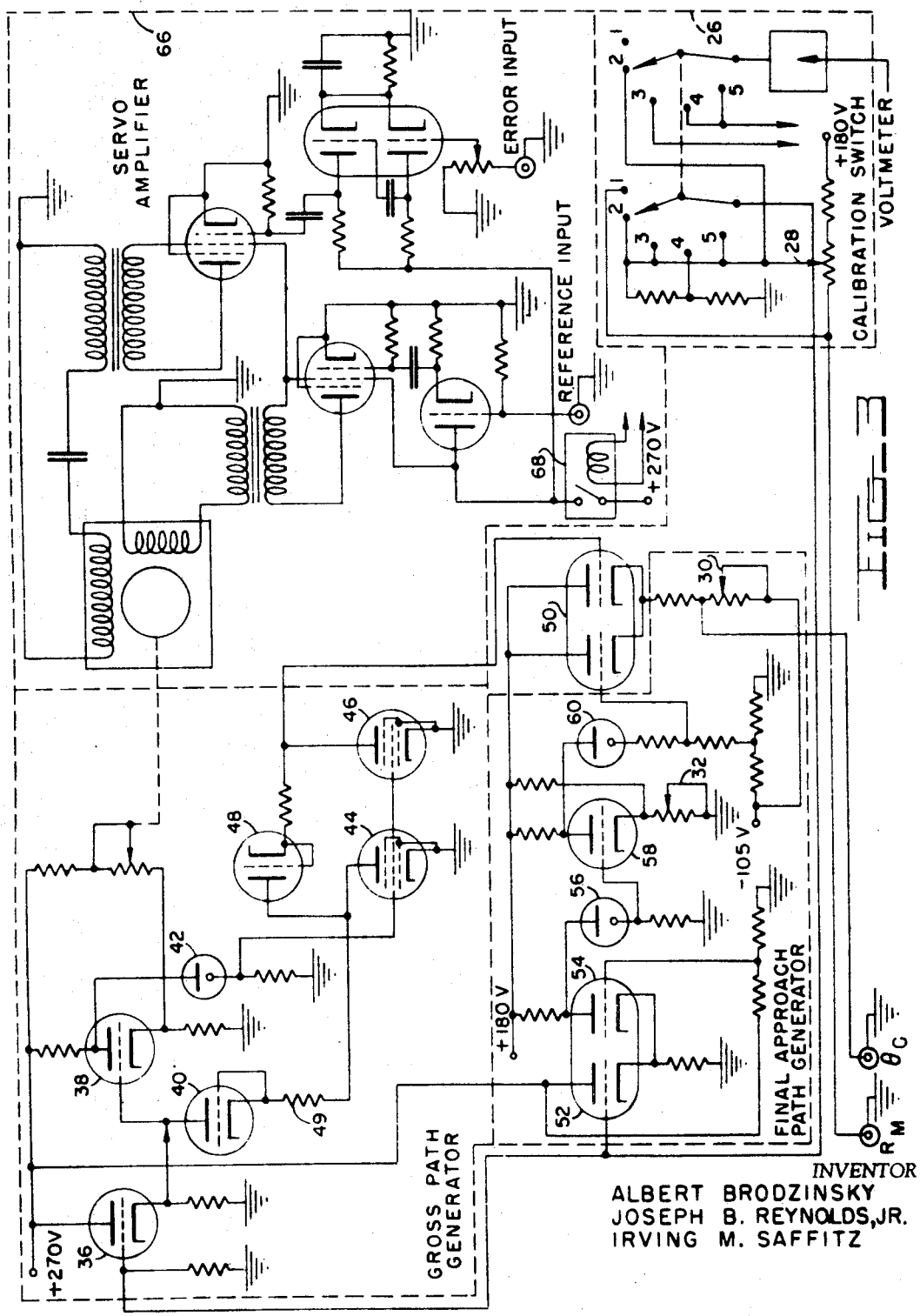

The invention described herein may be manufactured and used by or for the Government of the United States of America for governmental purposes without the payment of any royalties thereon or therefor.

This invention relates to an automatic controlled approach system for aircraft, and more particularly to an automatic aircraft carrier controlled approach system.

This application is a division of application Ser. No. 259,275 filed Nov. 30, 1951, for Automatic Carrier Controlled Approach System, now Patent No. 3,131,018 issued Apr. 28, 1964.

In the prior art there is known of two successful approach systems for aircraft. These two systems, however, are limited to land-based operations. One of these systems is known as the GCA or ground controlled approach system and uses a precision radar determination of the aircraft position and voice talk-down of the aircraft along a predetermined approach path. The other system, known as the ILS, or instrument landing system generates an approach path in the air for the aircraft by means of a pair of crossed electromagnetic beams. The angular deviation of the aircraft from the approach path appears as a visual deflection of a crossed-pointer meter. The pilot then controls the aircraft position to "zero" the crossed-pointer meter. The automatic carrier controlled approach system presents most of the technical and operational problems of the automatic GCA system and the automatic ILS system. In addition, the automatic carrier controlled approach system is further complicated by the fact that an aircraft carrier landing strip is a moving, unstable platform of relatively minute dimensions. The carrier landing strip is subject to yaw, roll, pitch, and heave. Thus, it can be readily appreciated that the system requirements are necessarily more stringent, and the attendant problem of correlating aircraft control with the motion of the aircraft carrier deck becomes a vital link in the system.

Still another important problem present in the automatic carrier controlled approach system which is not present in the GCA or ILS systems is the type of flight pattern used by carrier-based aircraft. This flight pattern is completely different from the straight line flight pattern used by land-based aircraft and requires far more complex equipment to generate a control pattern.

It is an object of this invention to provide a novel approach system for aircraft which generates a desired control path of approximately semicircular configuration.

It is a further object of the present invention to provide a novel approach system for aircraft which is fully automatic once the aircraft has come within the system limits.

It is a further object of the present invention to provide a novel approach system for aircraft having an entry-error closure circuit to allow considerable deviation of the aircraft from the computed path at the time of "capture" of the aircraft.

It is a further object of this invention to provide a novel approach system for carrier-based aircraft which will utilize substantially the same semicircular flight pattern now used by carrier-based aircraft.

It is a further object of the present invention to provide a novel approach system for carrier-based aircraft which generates an initial or gross path for the aircraft from the point of "capture" of the aircraft to a point several hundred yards aft of the carrier.

It is a further object of the present invention to provide a novel approach system for carrier-based aircraft which generates a final approach path which continues from a point several hundred yards aft of the carrier to a point past the end of the flight deck of the carrier and along the center line of the carrier flight deck.

For a further comprehension of the invention, and of the objects and advantages thereof, reference will be had to the following description and accompanying drawings, and to the appended claims in which the various novel features of the invention are more particularly set forth.

Figure 11:
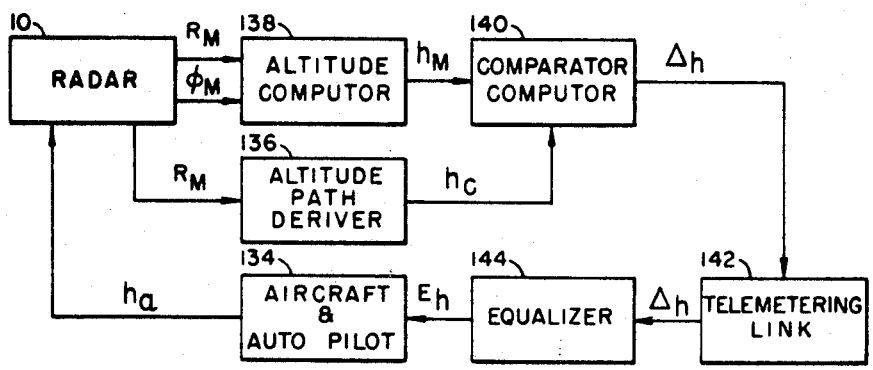
Figure 12:
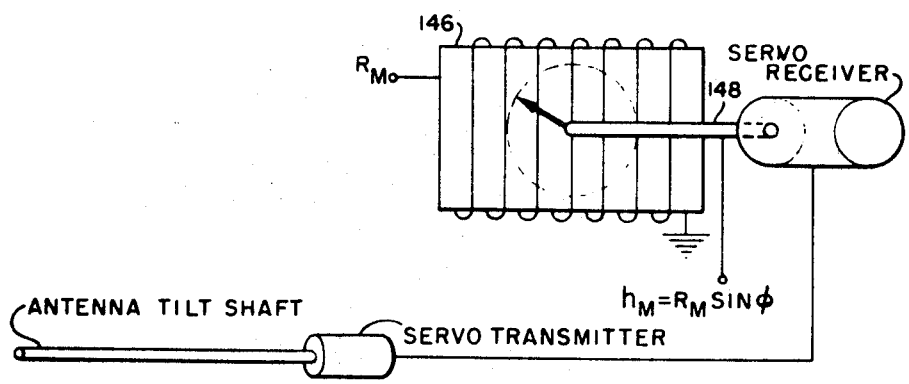
Figure 13:
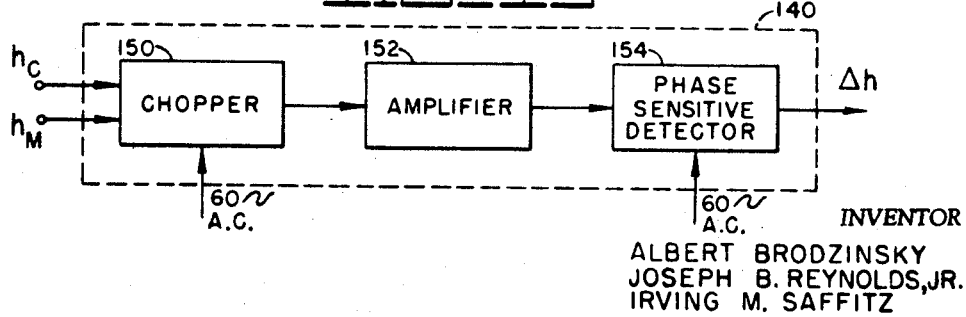
Figure 14:
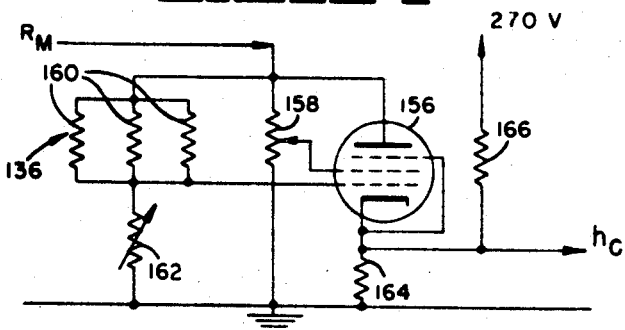
Figure 15:
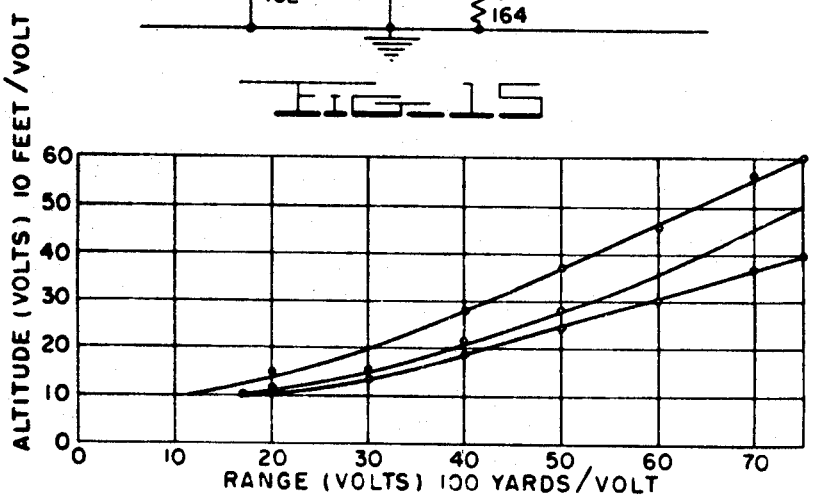
Figure 16:
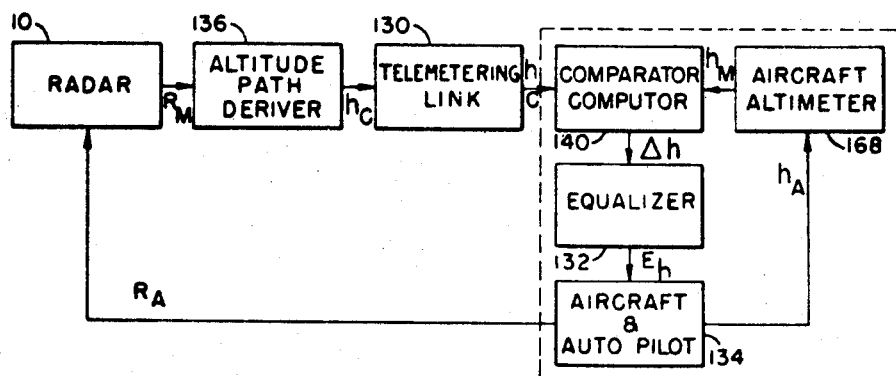

Referring now to the drawings wherein a preferred embodiment of the novel automatic approach system is shown:

FIGURE 1 is a block diagram of the turn axis control;
FIGURE 2 is a plan view of the flight patterns used by the aircraft;
FIGURE 3 is the circuit of the flight path deriver as used in the preferred embodiment of the invention;
FIGURE 4 is a plot of range versus calculated azimuth;
FIGURE 5 is a block diagram of the comparator-multiplier;
FIGURE 6 is the circuit of the comparator-multiplier as used in the preferred embodiment of the invention;
FIGURE 7 is a diagram of the flight path geometry involved in the turn axis control;
FIGURE 8 is a plot of the function ($\theta$) versus antenna azimuth;
FIGURE 9 is a diagrammatic view of the lateral deviation deriver as used in the preferred embodiment of the invention;
FIGURE 10 is the circuit of the equilization network as used in the preferred embodiment of the invention;
FIGURE 11 is a block diagram of one form of altitude control as used in the preferred embodiment of the invention;
FIGURE 12 is a diagrammatic view of the altitude computer as used in the preferred embodiment of the invention;
FIGURE 13 is a diagrammatic view of the altitude comparator computer as used in the preferred embodiment of the invention;
FIGURE 14 is the circuit of the altitude path deriver as used in the preferred embodiment of the invention;
FIGURE 15 is a plot of the range versus altitude of the altitude path deriver;
FIGURE 16 is a block diagram of another form of altitude control as used in the preferred embodiment of the invention.

The invention, in broad terms, contemplates obtaining position data of the aircraft by means of radar located aboard the aircraft carrier. The measured position data is compared with the desired position data and suitable error signals are derived. These signals are translated into turn axis control signals and elevation control signals. The signals are then telemetered to the aircraft under control of a radio link and are applied to the automatic pilot to cause the aircraft to close out the error. Since the turn axis control and the elevation control components form, in essence, closed servo loops, the heading and altitude changes in the aircraft due to the reception of the error signals result in a new position of the aircraft, thereby closing the loops, the new position data again being determined by radar.

Turn axis control

Referring now specifically to FIGURE 1 of the drawings, there is shown a block diagram of the automatic carrier controlled approach system turn axis control. This control determines the heading of the aircraft once the aircraft has come within the system limits. Referring now to the various components which make up the turn axis control.

Radar

The block 10 of FIGURE 1 represents a radar set. In order to automatically control the approach path of an aircraft, it is first necessary to accurately locate and continuously track the aircraft as it moves in its flight pattern. The radar set 10 should be capable of tracking the target aircraft from a maximum range of approximately 8000 yards to a minimum range at the final position of the approach path of approximately 150 yards. Further, range accuracies in the order of +10 yards and angular tracking accuracies of better than +¼° are necessary.

Still another requirement which the radar set 10 must possess is the ability to track low flying aircraft without ambiguity which requires low angle tracking in the presence of maximum "sea returns." Thus, it can be seen that moving target indicator or doppler radar can be used with advantage as the radar set in the turn axis control.

A radar 10 capable of obtaining measured $R_m$, measured azimuth, $\theta_m$, of the aircraft with respect to a line parallel to the fore-aft line of the aircraft carrier and passing through radar site, and measured elevation, $\phi_m$, of the aircraft is disclosed in the patent to Muntz et al., Patent No. 2,416,591, issued Feb. 25, 1947.

It will be noted that in the radar 10 disclosed in the patent to Muntz et al. azimuth, elevation, and range voltages are fed to a cathode ray tube to give a visual indication. This radar 10 can be advantageously used in the automatic carrier controlled approach system by tapping off the range, elevation and azimuth voltages, and if needed, these voltages can be converted to shaft positions by servo mechanisms which are old and well-known in the art. The elevation voltage derived from the radar 10 is fed to the altitude control means (to be discussed later).

Further, it should be noted that by the addition of a conventional gating circuit, the radar 10 will select only those targets or aircraft which come within a certain zone, namely, those flying 7000 to 8000 yards away from the radar site. Thus it can be seen that a flight path entry gate or zone has been established.

Flight path deriver

The primary function of the flight path deriver 12, see FIGURE 1, is to generate the desired control path with respect to the aircraft carrier that the airplane is to follow. Measured range information or $R_m$ from the radar 10 is fed into the flight path deriver 12 and $\theta_o$, the desired azimuth of the aircraft with respect to a line parallel to the fore-aft line of the carrier and passing through the radar site is the output.

To be of practical use in carrier operations, the control path generated by the flight path deriver 12 must conform to the flight path now used in carrier operations. This typical flight pattern is shown in FIGURE 2. The aircraft carrier 14 is moving into the wind so that the air mass passing over the flight deck moves at approximately 30 knots. The flight pattern 16 is that of an aircraft landing aboard the carrier 14. The distance between points 18 and 20, in normal operations, is approximately 1200 yards. The important part of this pattern and the part which is described by the flight path deriver 12 is the semi-circular portion 22 which starts at point 20 and ends at the beginning of the flight deck.

Still another important feature which the flight path deriver 12 must be limited by is that no generated flight path must be allowed to exceed the maximum safe rate of turn for low flying aircraft. Consistant with this requirement, the flight path deriver 12 generates an approximately semi-circular path 24 whose diameter is between 7000 and 8000 yards. However it is to be noted that 7000 to 8000 yards is merely illustrative and in no sense is to be considered a limiting feature of this invention.

Also, the flight path deriver 12 must possess a flight path entry gate. The aircraft about to enter into the flight pattern will not enter at the exact same lateral point each time. Therefore an entry gate of approximately 1000 yards mus be provided to "capture" the aircraft. Accordingly, the flight path deriver 12 must be capable of generating a family of flight paths which intersect a 90° azimuth with respect to the carrier 14 at ranges of from 7000 to 8000 yards. It should be noted that this family of flight paths coalesce into a single flight path at approximately 4000 yards.

Lastly, it should be noted that the radar site aboard the carrier 14 is not coincident with the flight deck center line, so that at ranges smaller than 400 yards, the resulting parallax is very severe and the flight path deriver 12 must correct the generated control path to pass the generated flight path down the carrier center line. This correction is accomplished by means of a final-approach circuit in the flight path deriver 12. This circuit remains inoperative at ranges in excess of 400 yards but is switched in by the range voltage when the aircraft reaches the 400 yard point. In this manner, the final portion of the control flight path is corrected from a line running parallel to the fore-aft line of the carrier and through the radar site to a line running down the middle of the flight deck.

Referring now to FIGURE 3 which shows the circuitry of the flight path deriver 12 used in the preferred embodiment of the invention. The purpose of the flight path deriver 12 is to take as an input the measured range $R_m$ from radar 10 and put out as an output $\theta_c$ which is the desired azimuth of the aircraft with respect to a line coincident to the fore-aft line of the carrier 14. The measured range voltage $R_m$ is fed to a calibration switch 26. Calibration switch 26 is a five position switch; position 1 being the operation position; positions 2 to 5 being calibration positions to adjust potentiometers 28, 30, and 32 in the flight path deriver 12 to certain desired levels. The function of this calibration switch 26 is to permit adjustment of various potentiometers which control the curvature of the final approach path which is the path from 400 yards to 150 yards away from the radar site. In calibration switch position 2, adjustment of potentiometer 28 is made by the use of a vacuum tube voltmeter, not shown. Calibration switch position 3 in cooperation with the vacuum tube voltmeter is used for the setting of potentiometer 32. Calibration switch position 4 in cooperation with the vacuum tube voltmeter controls the setting of potentiometer 30. Calibration switch position 5 is a check position to check the voltage output of the vacuum tube voltmeter. The measured range voltage $R_m$ after passing through calibration switch 26 is fed to a cathode follower 36. The cathode follower 36 is used to decouple the radar range output circuit from the input circuit of the flight path deriver 12. The cathode follower 36 serves as an impedance transforming device. Cathode follower 36 uses one-half of a dual triode vacuum tube. Measured range voltage $R_m$ is fed to one grid of this tube and a voltage is taken off the cathode which is associated with the above-mentioned grid. This cathode voltage is split, part of it going to a range sensitive D.C. amplifier 38, and the other part of the voltage going to tube 40 which is also half a dual triode vacuum tube. It should be noted that the voltage taken from the cathode follower 36 is linear in function and that part which is fed to the range sensitive D.C. amplifier 38 remains linear and is merely amplified by the D.C. amplifier 38. The amplified voltage from the D.C. amplifier 38 is then fed to a D.C. coupler 42. The D.C. coupler 42 is a voltage regulator gas tube and serves merely as a D.C. condenser. The voltage is then fed to the screen grids of tubes 44 and 46 which are each a pentode vacuum tube. The other part of the voltage from the cathode follower 36 goes to tube 40 and the voltage taken off the cathode of this tube is non-linear in function. This non-linear voltage is placed on the plates of tubes 44 and 48 which are connected in parallel. Tube 48 is a zero biased triode. It should be noted that the cathode resistor 49 of tube 40 is the plate load of tubes 44 and 48. The tube 48 has a cathode load of 2600 ohms which is also part of the plate load of tube 46. The output of tube 46 is the output of the gross path generator or deriver. This output voltage taken from the plate of tube 46 is coupled into the grid of mixer tube 50 which is a dual triode vacuum tube. The combined function of tubes 38, 40, 44, 46, and 48 is to generate the gross portion of the approach path by means of non-linear voltage division. The input to this divider system is the output of tube 36 and the output of the divider system is the plate voltage of tube 46. This flight path voltage is the signal which is used by the aircraft in the flight control path from 8000 to 400 yards.

It should also be noted that the measured range voltage $R_m$ which passes through the calibration switch 26 is also fed to another cathode follower 52. Therefore the grid voltage of tube 52 is the measured range voltage $R_m$. This grid voltage is high voltage initially, ranging from 70 to 80 volts since the radar has a scale factor of 100 yards per volt and the aircraft is "captured" at a distance of 7000 to 8000 yards abreast of the carrier. The cathode of tube 52 is tied to the cathode of tube 54 which is half a dual triode vacuum tube. The grid of tube 54 is rigidly fixed in potential by the fractionating device of 470,000 ohm resistor and an 8200 ohm resistor in conjunction with the B+ supply of 270 volts. As the aircraft moves along the controlled approach path from 8000 to 400 yards, the voltage on the grid of tube 52 drops continuously until the voltage has a value of 4 volts. This voltage is reached when the aircraft is 400 yards away. The tube 54 begins to conduct because the grid to cathode voltage rises to the point of conduction. This means that the plate voltage of switch tube 54 falls. This voltage is then fed to a D.C. coupler 56, which is a voltage regulator gas tube, which reduces the level of this voltage. The voltage is then fed to the grid of a path generator tube 58, a dual triode vacuum tube. As the grid voltage of this tube 58 drops, the plate voltage rises and is fed to a D.C. coupler 60 which is a voltage regulator gas tube and is finally fed into the other half of the mixer tube 50. Here the gross path voltage and final approach path voltage are mixed so that the final approach path of the aircraft is corrected for parallax. This is clearly shown in FIGURE 4, 62 representing the curve generated by the gross path generator and 64 representing the corrected final approach path. Accordingly, it can be seen that the gross path generator and the final approach path generator generate the curve shown in FIGURE 4 by taking the measured range voltage $R_m$ and converting this into a desired azimuth voltage $\theta_c$.

The only other element in the circuit of the flight path deriver 12 is the servo amplifier 66. The servo amplifier 66 takes a reference input voltage and an error input voltage from the comparator-multiplier (to be discussed later) and by means of old and well-known servo techniques adjusts the voltage on tube 38, the range sensitive D.C. amplifier. This allows the aircraft to enter the system at any lateral point between 7000 and 8000 yards and allows the gross path generator to generate a flight path for the aircraft which enters at any individual point in the entry gate. For a further description of the servo amplifier reference may be had to the book "Automatic Feedback Control," by W. R. Ahrendt and J. F. Taplin, published in 1951 by McGraw-Hill. The only other feature of the servo amplifier which should be noticed is the time delay relay 68 which cuts out the servo amplifier 66 after 4.9 seconds. This relay 68 is placed in the servo amplifier circuit because after 4.9 seconds all initial error will have been driven to zero. Upon capture of the aircraft, since the servo entry gate is energized, the flight path generated will be moved over and fixed to the aircraft. To provide reduction of the initial error to zero, 4.9 seconds is alloted to the servo closure circuit. After this period of time, the servo closure circuit is deenergized, the flight path is fixed in space and the system control of the aircraft takes over. In other words, once the aircraft has entered the system limits and 4.9 seconds has elapsed, the aircraft will be fully controlled by the automatic carrier controlled system.

*The comparator-multiplier*

The computed azimuth, $\theta_o$, which is the output of the flight path deriver 12, the measured azimuth of the aircraft, $\theta_m$, and the measured range $R_m$, which are obtained by the continuously tracking radar 10 are fed into the comparator-multiplier unit 70, see FIGURE 1, which transforms them into a single D.C. voltage representing the relationship $R_m \Delta\theta$. The function of the comparator-multiplier 70 is two-fold as may be inferred from the nature of the mathematical expression. First, the comparator-multiplier 70 performs a subtraction between $\theta_m$ and $\theta_c$. Second, the comparator-multiplier 70 multiplies the difference so obtained by $R_m$. Referring now to FIGURES 5 and 6 which show schematic and circuit diagrams of the comparator-multiplier 70. The comparator-multiplier 70 consists of a multivibrator 72 which generates a square wave voltage of reference phase which is passed down into a decoupling cathode follower 74 and from the cathode follower 74 goes into the servo amplifier 66 of the flight path deriver 12, previously discussed. The square wave output from the multivibrator 72 is also taken in opposite phase from the respective anodes of the pair of multivibrator tubes and applied through cathode followers 76 and 78 to the grids of a push-pull power amplifier 80. The output of the push-pull amplifier 80 is applied to a relay 82 having single pole double throw switching action. This relay 82 performs the switching action, referred to herein as chopping. In operation, the calculated azimuth, $\theta_c$, voltage is applied to one switch terminal 84 and the measured azimuth, $\theta_m$, voltage is applied to the other switch terminal 86 and an output is taken from the relay switching arm 88. The chopper output is a voltage alternating at the chopping rate between the value of $\theta_m$ and $\theta_c$. The peak to peak value of their voltage is the difference azimuth voltage or $\Delta\theta$. This difference azimuth voltage or $\Delta\theta$ is passed through a coupling condenser 89 to a range sensitive amplifier 90, where it is mixed with and hence is multiplied by the measured range voltage, and fed out as $R_m\Delta\theta$. The measured range voltage is, of course, obtained from the radar set 10 and is fed directly to the flight path deriver 12 and the comparator-multiplier 70. See FIGURE 1. The measured range voltage $R_m$ which is fed to the comparator-multiplier 70 is fed to a cathode follower 92 and from there to the screen grid of the range sensitive amplifier 90. Here the $R_m$ voltage and the $\Delta\theta$ voltage are multiplied together. After being multiplied together, the $R_m\Delta\theta$ voltage passes to a cathode follower 94 and then is fed to the lateral deviation deriver 96, which will be discussed later.

It is sufficient to note at the time that the lateral deviation deriver 96 corrects this voltage by multiplying it by a voltage function $K(\theta)$. The $R_m\Delta\theta$ voltage now has the form of $K(\theta)R_m\Delta\theta$ and is alternating at the chopping rate. However, in order that this voltage be in useable form it is necessary that it be rectified and the sense of the difference $\Delta\theta$ with respect to $\theta_c$ be determined. This is done in the comparator-multiplier 70. Accordingly, the $K(\theta)R_m\Delta\theta$ is fed from the lateral deviation deriver 96 into the grid of an amplifier 98 in the comparator-multiplier as shown in FIGURE 5. From the amplifier 98, the voltage is fed to a cathode follower 100. The voltage then is fed to a phase sensitive detector 102. The phase sensitive detector 102 converts the voltage $K(\theta)R_m\Delta\theta$ into a direct voltage whose polarity is determined by the sense of deviation of $\theta_m$ from $\theta_c$. The operation of this detector 102 is old and well-known and is fully explained in "Theory of Servomechanisms" paragraphs 3–12, pages 111 and 112 by James Nichols, and Phillips published by McGraw-Hill, 1947. In the comparator-multiplier 70, the function of the phase sensitive detector 102 is as follows. The alternating error voltage $K(\theta)R_m\Delta\theta$ of 0° or 180° phase with respect to the fixed phase reference feeds the error input transformer 104. See FIGURE 6. The transformer output is applied out of phase to the anodes of a pair of diodes 108 and 110. The reference phase is applied in the same phase to the anodes of said diodes and will be passed by whichever tube is receiving a positive error signal from transformer 104. The phase of the error voltage relative to the reference voltage is 0° or 180° according to whether the aircraft is to the right or left of the generated path. The output of the phase sensitive detector 102 is a direct voltage with respect to ground whose magnitude varies directly as the error of the aircraft from the generated path and whose sign with respect to ground varies as the phase of the error voltage.

It should be noticed that in the comparator-multiplier 70 before it is possible to determine the $\Delta\theta$ voltage, it is first necessary to correct the comparator-multiplier 70 for any error which may be present in the system. The error is corrected by using a bleeder circuit 106 which generates a simulated maximum range voltage. The bleeder 106 is set up to feed equal voltages to contacts 84 and 86 of the chopper 82. This equal voltage is fed into the range sensitive amplifier 90. From the range sensitive amplifier 90, the voltage is fed through cathode follower 94 into amplifier 98 through cathode follower 100 and then into the phase sensitive detector 102. The phase sensitive detector 102 detects any difference in phase between the reference voltage and the simulated $\Delta\theta$ voltage and detects the magnitude of the simulated $\Delta\theta$ voltage. Any error in calibration in the phase sensitive detector is indicated by applying the output of the phase detector 102 to one grid 109 of a pair of triodes 105 and 107 having equal cathode resistor 112 and 114 and a voltmeter 116 connected between the cathodes. The grid 111 of the other triode 107 is grounded. This error will appear as an output either above or below zero volts depending on its sense. The meter 116 will indicate the presence and sense of the error.

*The lateral deviation deriver*

Reference to FIGURE 7 shows the flight path geometry involved in the automatic carrier controlled approach path. This figure illustrates the functional relation existing between $x$, the perpendicular distance of the aircraft from the derived path, and $R_m\Delta\theta$. In this figure the fan tail of the carrier is shown at 118, the aircraft at 120. $R_m$ is the measured range of the aircraft to the carrier; curve 122 is the derived flight path of the aircraft; $\Delta\theta$ is the angle between the present position of the aircraft and where it would be for the value of $R_m$ measured if it were following the derived path, or in other words $\Delta\theta$ is the difference between $\theta_m$, the measured azimuth, and $\theta_c$, the azimuth which the aircraft would have for the given value of $R_m$ if it were on the derived path; and $x$ is the perpendicular distance from the aircraft to the derived path. Therefore it is seen that $\Delta\theta$ varies with $R_m$ and $x$ approaches zero as $\Delta\theta$ approaches zero. In order to reduce $x$ to zero gradually to avoid turning the aircraft sharply, $\Delta\theta$ is reduced to zero gradually. This is most conveniently done graphically by letting a function $$K \text{ of } \theta = \frac{x}{R_m\Delta\theta}$$

and plotting it against the antenna azimuth of the tracking radar. The lateral displacement $x$ is then equal to $K(\theta)R_m\Delta\theta$. This curve is shown graphically in FIGURE 8. In order to derive the lateral distance $x$, the voltage $R_m\Delta\theta$ may be fed into a linear potentiometer 124 which is actuated by a cam 126 rotated through suitable gearing 128 by the tracking radar antenna, the shape of the cam 126 being determined by the curve shown in FIGURE 8. Thus, it can be seen that the cam shaft position is always directly related to $\theta_m$, the measured azimuth, and the potentiometer output is proportional to $K(\theta)R_m\Delta\theta$. FIGURE 9 discloses a diagrammatic view of the cam 126 and its connection to the antenna as well as the linear potentiometer 124.

*The radio link*

The control information obtained from the output of the comparator-multiplier 70 which is direct voltage is now telemetered to the aircraft under control. For the turn axis control system, only one channel for the telemetering equipment is required. However, since the aircraft must also be controlled in altitude (to be discussed later), another channel of the telemetering equipment must be made available. Finally, for tactical considerations, it is desirable to provide a plurality of spare channels. Accordingly, a telemetering system 130, see FIGURE 1, of the type disclosed by the patent to C. H. Hoeppner, Patent No. 2,537,056, issued Jan. 9, 1961, can be used advantageously in the automatic carrier controlled approach system.

The voltage transmitted by the telemetering equipment 130, as far as the turn axis control is concerned, is the voltage value of $x$. This value it will be remembered is equal to $K(\theta)R_m\Delta\theta$.

*Equalization network*

In order to provide stable control, with relatively rapid closeout of transients and with relatively low accelerations imposed on the aircraft, it was found necessary to use proportional plus derivative control. Thus the use of an equalization network 132 to cause the rate damping to prevent oscillations is obvious. The error signal or voltage coming from the equalization network 132 should be proportional to the sum of the lateral deviations of the aircraft plus the time derivative of the lateral deviation. Expressed mathematically, it would appear as $$E_s = k_1 x + k_2 \dot{x}$$

where $E_s$ equals the error signal controlling the lateral position of the aircraft. The constant $k_1$ representing the lateral error control proportionality constant and the constant $k_2$ representing the lateral error lead proportionality constant. The symbol $x$ standing for the perpendicular distance of the aircraft from the derived path. The symbol $\dot{x}$ standing for the time rate of change of the perpendicular distance. Since $x$ appears as a direct voltage, it is relatively easy to derive such an error signal by means of a simple equalization network as shown in FIGURE 10. It should be noted that the value of each of the various components of the equalization network 132 will vary with each type of aircraft. Accordingly it will be realized that the equalization network 132 should properly be located in the controlled aircraft, although it can be located aboard the aircraft carrier 14. For a more detailed discussion of the equalization network 132, which is used in the automatic carrier controlled approach system and which is old and well-known, references should be had to the book "Theory of Servomechanisms" by H. M. James, N. B. Nichols and R. S. Phillips published by McGraw-Hill, New York, 1947.

Automatic pilot

The function of the aircraft automatic pilot 134 is to take $E_s$, the error signal controlling the lateral position of the aircraft and apply it to the aircraft control surfaces to automatically position the aircraft in the proper place in the controlled flight path. Of course, $E_s$, in the turn axis control servo loop, is the error voltage generated for correcting the aircraft in its lateral position error. Similarly the automatic pilot 134 will receive an $E_h$ or error signal correcting for altitude error of the aircraft. This signal and its derivation will be discussed later. It is sufficient at this time to know the automatic pilot 134 must be capable of controlling the aircraft with two input signals, namely, error voltages as to altitude and lateral position. An automatic pilot system capable of performing these functions is disclosed in U.S. Patent No. 2,774,558 issued Dec. 18, 1956, Patent No. 2,853,254 issued Sept. 23, 1958, and Patent No. 3,072,369 issued Jan. 8 1963, all to Ross C. Alderson.

Summary of turn axis control

*Operation.*—The elements of the turn axis control system of the automatic carrier controlled approach system are a continuously tracking radar set 10 to determine the measured range and azimuth of an aircraft from the actual range and azimuth once the aircraft has been "captured" by the system. The measured range from the radar set 10 is fed to a flight path deriver 12 which generates the proper approach path in the form of a calculated azimuth. This calculated azimuth and the measured azimuth from the radar set 10 are compared in the comparator-multiplier 70 and the difference is then multiplied by the measured range fed in also from the radar set 10. The measured range voltage times the difference in azimuth voltage is fed into the lateral deviation deriver 96 where a fixed voltage variation is introduced to calculate the lateral deviation of the aircraft from the generated flight path. The lateral deviation deriver output is an error voltage to correct the lateral position of the aircraft. This error voltage is fed back into the comparator-multiplier 70 where the sense of the error voltage is determined in the phase sensitive detector 102. The detector 102 produces a direct voltage output whose polarity and magnitude reflect respectively the sense and magnitude of the aircraft's lateral deviation. The error voltage is then fed in this form to a radio frequency telemetering link 130, which transmits the error voltage to the aircraft. Aboard the aircraft, the error voltage is put through an equalization network 132 to prevent oscillations and provide stable control. This voltage is now passed to an automatic pilot 134 and the position of the aircraft is corrected. The radar 10 senses this new position and the cycle is repeated.

Altitude control

In order to completely control the aircraft in flight in a controlled flight path, two elements are necessary. The first element is lateral or turn axis control. A system capable of performing this function has been disclosed. The second element must be altitude control. This function can be approached, in general, in the same manner that the lateral control system was approached. This means it is desirable to derive an altitude error and impress this voltage upon the automatic pilot 134 (FIGURE 1) to place the aircraft in its proper position with respect to altitude. There are two means available for performing the function of deriving an altitude error and impressing this upon the control surfaces of the aircraft. The first way to obtain altitude control is by means of height finding radar. The second way is to obtain altitude control by means of an airborne altimeter. Now considering each of these methods separately.

Automatic altitude control employing radar height finding

The measured range $R_m$ and measured elevation $\phi_m$ are gathered by a carrier situated radar set 10. See FIGURE 11. The measured range voltage $R_m$ and the measured elevation $\phi_m$ are fed to a computer 138 where they are converted to aircraft altitude, $h_m$. Now the aircraft altitude $h_m$ and the desired altitude $h_c$ are both fed into a comparator computer 140 where these two voltages are compared and $\Delta h$, which is the difference between $h_m$ and $h_c$, is derived. The voltage $\Delta h$ is passed to radio frequency telemetering link 142 and sent to the aircraft. Aboard the aircraft the voltage $\Delta h$ is fed into an equalizer 144 and the voltage $E_h$ which is the error signal controlling the altitude of the aircraft is derived. The automatic pilot 134 of the aircraft receives this $E_h$ voltage and changes the altitude of the aircraft. The radar 10 senses the position change in the aircraft and the cycle is repeated. It should be noted that the altitude control employing radar height finding is a closed loop and every change in the aircraft position is immediately recorded on the aircraft carrier.

Referring now to the various elements which make up the automatic altitude control, it can be seen from FIGURE 11 that the radar requirements are approximately the same as those required in the turn axis control. Accordingly the same type of radar equiment could be used here as in the turn axis control.

The altitude computer is shown in more detail in FIGURE 12. The measured range $R_m$ is fed to a sinusoidal voltage generating card potentiometer 146 whose rotary arm 148 is driven through a servo system in synchronism with the antenna tilting mechanism of the height finding radar. Therefore the potentiometer arm 148 is mechanically driven in accordance with the measured elevation angle $\phi_m$. The output of the altitude computer, taken from arm 148, is therefore $R_m \sin \phi$ which is the measured altitude $h_m$.

The measured altitude $h_m$ is fed to an altitude comparator computer 140. The comparator computer 140 shown in FIGURE 13 consists of a chopper 150, an amplifier 152, and a phase sensitive detector 154 similar to those used for azimuth correction. See FIGURE 6. The input $h_m$ is fed in from the altitude computer 138 and $h_c$, the desired altitude from the altitude path deriver 136 (to be discussed later) is also fed to the comparator computer 140. The output of the comparator computer 140 is $\Delta h$, the difference between $h_m$ and $h_c$. The circuits of the chopper 150, the amplifier 152, and the phase sensitive detector 154 are the same as those elements in the comparator-multiplier 70 of the turn axis control.

The altitude path deriver 136 of the automatic altitude control is shown in FIGURE 14. As can be seen from this figure, tube 156, which is a pentode vacuum tube operated near cutoff, has the range voltage $R_m$ put on the plate. This voltage after passing through an adjustable resistor 158, which is a 100,000 ohm resistor, is also placed on the screen grid of tube 156. The thyrite resistors 160 are used to give a family of non-linear response curves for various setting of resistors 158 and 162. Thus it can be seen from FIGURE 15 that, in effect, a vertical window or gate is generated which in cooperation with the horizontal gate of the turn axis control forms a rectangular window or gate through which the aircraft must fly to come within the system. Resistor 162, in FIGURE 14 which is an adjustable 3,000,000 ohm resistor controls the voltage to the control grid. Resistors 164 and 166 which are 82,000 and 2,200,000 ohm resistors respectively, are a voltage divider network for the B+ supply of 270 volts and produce at their junction a voltage of 10 volts. The output, which is $h_c$, is therefore always 10 volts or greater.

The telemetering link 130 is the same as described in connection with the turn axis control. The equalizer 132 is similar to the equalizer described in the turn axis control. The automatic pilot 134 can be the same as in the turn axis control.

*Automatic altitude control employing a radio altimeter*

The other method of altitude control, disclosed in FIGURE 16, is by means of an absolute altimeter 168 mounted in the aircraft. The measured range $R_m$ of the aircraft is gathered by means of a radar set 10 mounted upon the aircraft carrier. This voltage is fed to an altitude path deriver 136 to give the desired altitude $h_c$ at a particular range. The desired altitude $h_c$ is then telemetered to the aircraft by means of the telemetering link 130. The aircraft altitude is measured aboard the aircraft by means of an absolute altimeter 168 and compared with the desired altitude in the comparator computer 140 and a suitable error signal or voltage is derived. This signal after passing through an equalizing network 132 is impressed on the automatic pilot 134. This is an open loop servo system via the carrier 14 since the aircraft carrier is unaware of the altitude assured by the aircraft. It is a closed servo loop via the airborne equipment.

The radar 10, altitude path deriver 136, telemetering link 130, comparator computer 140, and automatic pilot 134 can be the same equipment as was disclosed in the automatic altitude control with radar height finding. However, it should be noted that in this instance the radar 10 need only be capable of determining range to affect altitude control of the aircraft.

The altimeter 168 can be any conventional and well-known radio altimeter as commonly used in aircraft.

Thus it can be seen that by means of a turn axis control and an altitude control, an automatic carrier controlled approach path system has been devised. This system generates a conventional flight path for carrier based aircraft and operates from a distance of 8000 yards to within 150 yards of the radar site. It is of course obvious that a plurality of aircraft could be conrtolled in the flight pattern merely by cascading the number of automatic approach systems.

From the foregoing description of the present invention; it is apparent that considerable modification of the features thereof is possible without exceeding the scope of the invention which is defined in the appended claims.

What is claimed is:

1. A voltage generating means comprising a lineally varying voltage source, a mixer circuit including pentode type vacuum tubes, linear coupling means coupling the screen grids of said pentode type vacuum tubes to said voltage source, non-linear coupling means coupling the plates of said pentode type vacuum tubes to said voltage source, and an output terminal connected to the plates of said pentode type vacuum tubes, a second non-linear coupler, switch means connected to said voltage generating source operative to connect said source to said second non-linear coupler when the voltage from said source reaches a predetermined level, and a second mixer having a pair of input terminals connected, respectively, to the output of said first mixer circuit and said second non-linear coupler.

2. In a computer for guiding an aircraft along a predetermined landing path in response to information based on the distance of said aircraft from an aircraft carrier, a voltage generating means comprising an input means to receive a varying voltage which varies with the distance of said aircraft from the carrier, a mixing circuit including two pentode vacuum tubes, a linear coupling means coupling said input means to the screen grids of said pentode tubes, a first non-linear coupling means coupling said input means to the plate of the first of said pentode tubes, a second non-linear coupling means coupling said plate of said first pentode tube to the plate of the second of said pentode tubes, an output terminal connected to the plate of said second pentode tube, a fourth coupling means, a switch means connected to said input means operative to connect said varying voltage to said fourth coupling means when said varying voltage reaches a predetermined level, and a second mixer having a pair of input terminals connected, respectively, to the output of said first mixer circuits and the output of said fourth coupling means.

References Cited

UNITED STATES PATENTS

| | | | |
|---|---|---|---|
| 2,413,063 | 12/1946 | Miller | 328—183 XR |
| 2,602,890 | 7/1952 | Gaines | 328—183 XR |
| 2,657,332 | 10/1953 | Lockhart | 328—185 XR |
| 2,224,580 | 12/1940 | Wise | 330—10 XR |
| 2,684,999 | 7/1954 | Goldberg et al. | 330—9 |
| 2,714,136 | 7/1955 | Greenwood | 330—9 |
| 2,715,209 | 8/1955 | Williams et al. | 330—9 XR |
| 2,724,022 | 11/1955 | Williams et al. | 330—9 XR |

ARTHUR GAUSS, *Primary Examiner.*

S. D. MILLER, J. A. JORDAN, *Assistant Examiners.*